Sept. 19, 1967  H. E. CLARY ETAL  3,341,924
METHOD OF MAKING A FORGED PISTON WITH AN OIL GALLERY
Filed Dec. 2, 1963  3 Sheets-Sheet 1
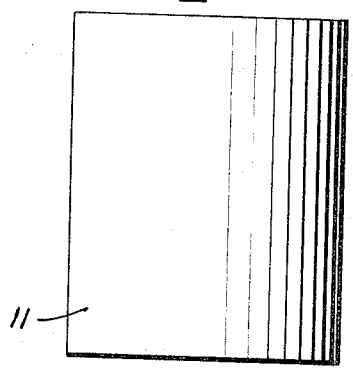
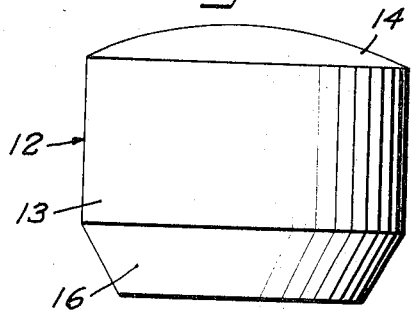
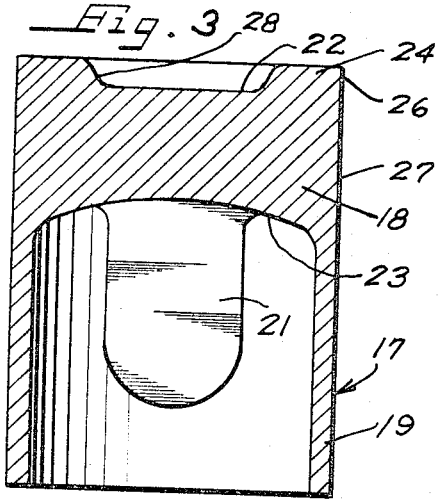
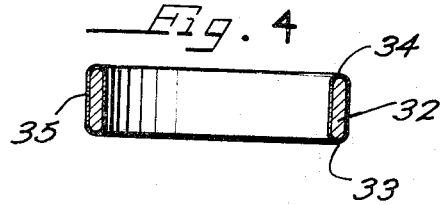
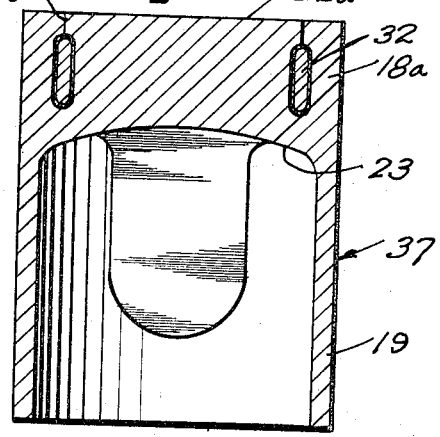
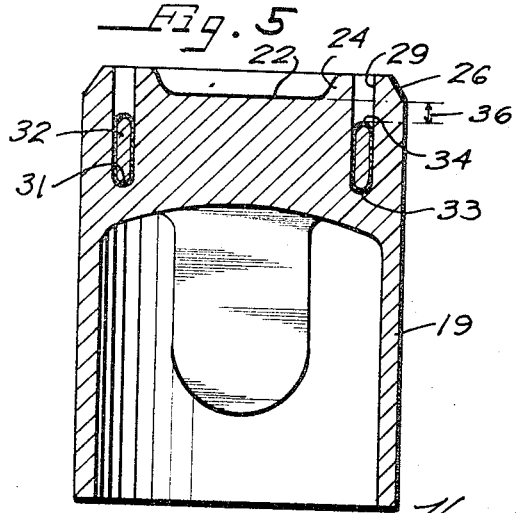
INVENTORS
Harry E. Clary
Thomas C. Richmond
BY
ATTORNEYS Sept. 19, 1967     H. E. CLARY ET AL     3,341,924
METHOD OF MAKING A FORGED PISTON WITH AN OIL GALLERY
Filed Dec. 2, 1963     3 Sheets-Sheet 2
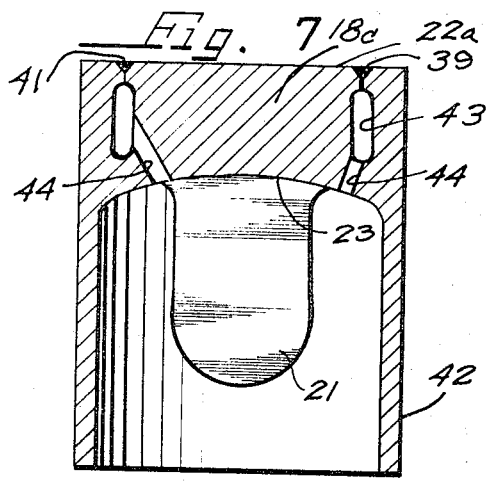
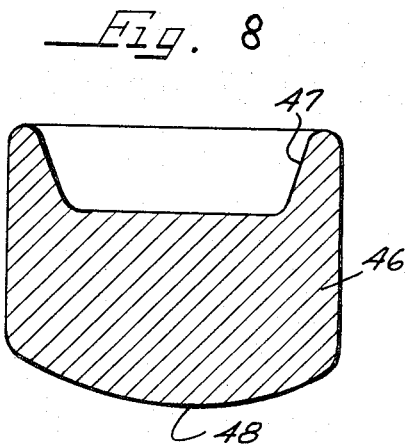
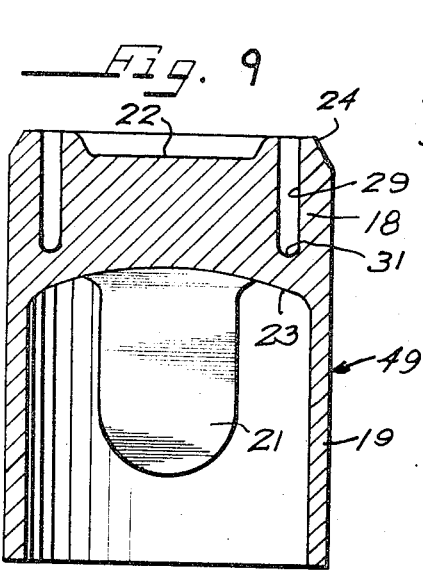
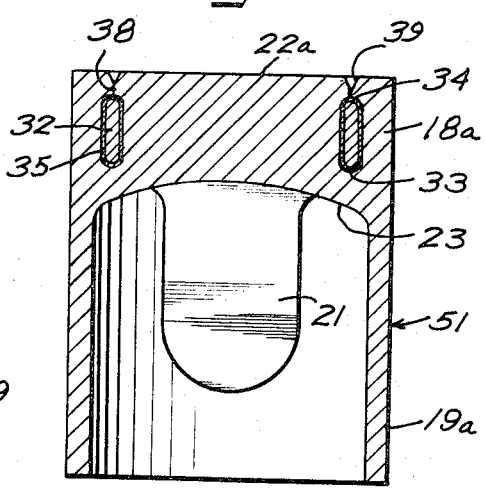
INVENTOR.
Harry E. Clary
Thomas C. Richmond
BY *Hill, Sherman, Meroni, Gross & Simpson* ATTORNEYS Sept. 19, 1967 H. E. CLARY ETAL 3,341,924
METHOD OF MAKING A FORGED PISTON WITH AN OIL GALLERY
Filed Dec. 2, 1963 3 Sheets-Sheet 3
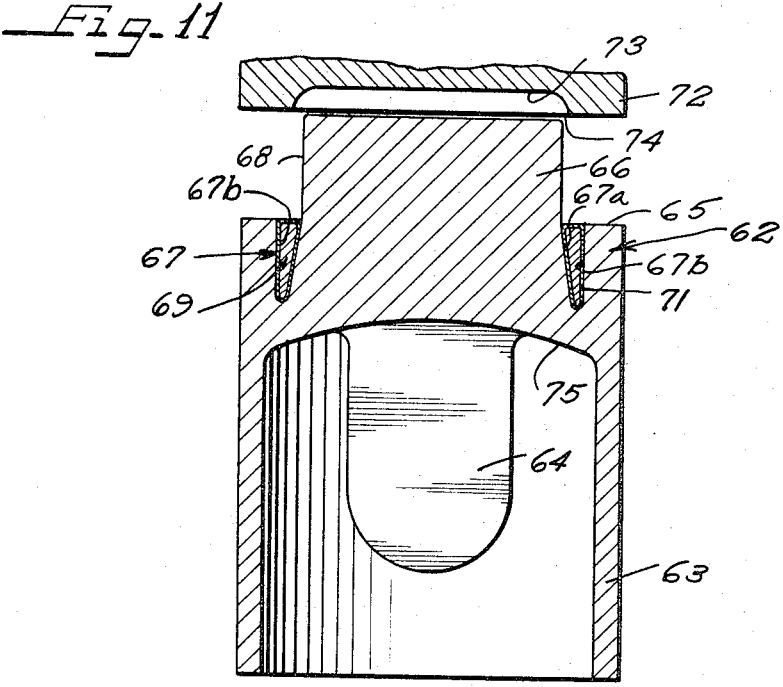
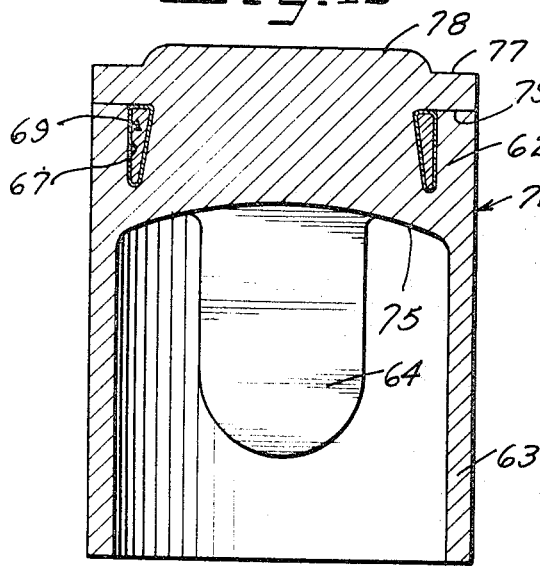
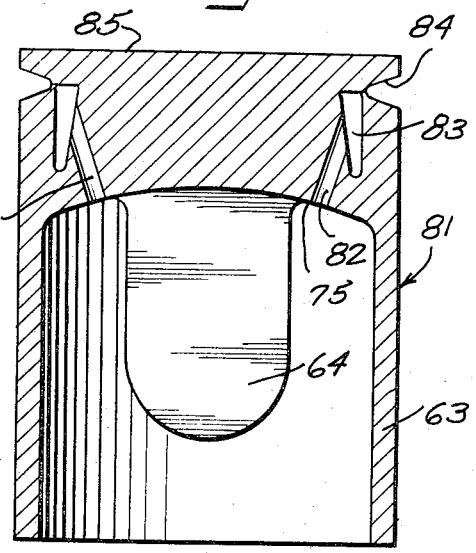
INVENTORS
Harry E. Clary
Thomas C. Richmond
BY ATTORNEYS United States Patent Office 3,341,924
Patented Sept. 19, 1967

3,341,924
METHOD OF MAKING A FORGED PISTON WITH AN OIL GALLERY
Harry E. Clary and Thomas C. Richmond, Chesterland, Ohio, assignors to TRW Inc., a corporation of Ohio
Filed Dec. 2, 1963, Ser. No. 327,336
18 Claims. (Cl. 29—156.5)

This invention generally relates to a piston and more particularly relates to a forged combustion engine piston with an oil gallery and the method of manufacturing said piston.

Pistons have been previously made with oil gallerys therein by machining a groove in the head portion of the piston and then welding a ring in place to close the groove and form an oil gallery therewith. The utilization of a ring to close the oil gallery poses a problem of forming the piston head top end wall with a substantially flat surface and of exactly matching the material of the ring with that of the piston to avoid differences in the rate of thermoexpansion thereof as well as a need to utilize at least two weld beads to hold the ring in position.

The method of the present invention provides a means for closing the oil gallery with a single small weld bead and provides a substantially flat piston head top end wall and substantially eliminates the problems of utilizing a separate closing ring with at least two weld beads and also substantially reduces the cost of manufacturing a forged piston with an oil gallery.

Therefore, it is an object of the present invention to provide an improved method of making a forged piston with an oil gallery.

It is still another object of the present invention to provide a method of manufacturing a forged piston having an oil gallery which is closed with a single weld bead.

It is still another object of the present invention to provide a method of manufacturing a piston with an oil gallery by providing a forged piston blank with a ridge on the face of the piston head adjacent the oil gallery groove and upsetting the piston head to close the oil gallery groove with the ridge material.

It is further another object of the present invention to provide a forged piston with a piston head having a flat top end wall consisting of a weld bead on the piston head, and an oil gallery formed within the piston head.

It is further another object of the present invention to provide a forged piston with a piston head having a flat top end wall, a well bead formed on the piston head side wall, and an oil gallery formed within the piston head.

It is still another object of the present invention to provide a forged piston with an oil gallery groove by providing a ridge on the face or top end wall of the piston head and placing a form ring in the oil gallery groove to maintain the configuration of the oil gallery groove while the ridge is upset to close the groove and removing the form ring from the oil gallery groove and thereafter sealing the closed oil gallery groove with a single weld bead to form a forged piston with an oil gallery groove.

These and other features, objects and advantages of the present invention will become more apparent after a careful consideration of the following description of the present invention when taken in conjunction with the accompanying drawings wherein like reference numerals and characters refer to like and corresponding parts throughout the several views.

On the drawings:

FIGURE 1 is an elevational view of a slug used to manufacture a piston constructed in accordance with the principles of the present invention;

FIGURE 2 is an elevational view of a preform utilized to manufacture a piston constructed in accordance with the principles of the present invention;

FIGURE 3 is a longitudinal cross-sectional view with parts in elevation of a forged piston blank utilized to manufacture a piston constructed in accordance with the principles of the present invention;

FIGURE 4 is a longitudinal cross-sectional view with parts in elevation illustrating a form ring utilized to manufacture a piston constructed in accordance with the principles of the present invention;

FIGURE 5 is a longitudinal cross-sectional view with parts in elevation illustrating a forged piston blank constructed in accordance with the principles of the present invention;

FIGURE 6 is a longitudinal cross-sectional view with parts in elevation of an upset piston blank used to manufacture a piston constructed in accordance with the principles of the present invention;

FIGURE 7 is a longitudinal cross-sectional view with parts in elevation of a piston with an oil gallery constructed in accordance with the principles of the present invention;

FIGURE 8 is a longitudinal cross-sectional view of another preform utilized to manufacture a piston in accordance with the principles of the present invention;

FIGURE 9 is a cross-sectional view with parts in elevation of a forged upset piston blank utilized to manufacture a piston constructed in accordance with the principles of the present invention;

FIGURE 10 is a longitudinal cross-sectional view with parts in elevation of an upset piston blank used to manufacture a piston constructed in accordance with the principles of the present invention;

FIGURE 11 is a longitudinal cross-sectional view with parts in elevation illustrating another embodiment of a forged piston blank constructed in accordance with the principles of the present invention;

FIGURE 12 is a longitudinal cross-sectional view with parts in elevation of an upset piston blank used to manufacture a piston construction in accordance with the principles of the present invention; and FIGURE 13 is a longitudinal cross-sectional view with parts in elevation of a piston with an oil gallery constructed in accordance with the principles of the present invention.

As shown on the drawings:

Referring to FIGURE 1 there is illustrated a solid cylindrical slug 11 used for the first step of manufacturing a forged piston. The slug 11 is the usual type of aluminum alloy slug of either cast or wrought bar stock.

The slug 11 is forged into a solid preform 12, FIGURE 2, having a cylindrical central section 13, a top convex section 14 and a bottom frusto-conical section 16. The preform 12 has a greater volume of stock at 14 which is the end which engages the punch during the forging operation to form the piston. This particular type of forged preform 12 is preferably utilized for alloys which are difficult to forge, such as aluminum alloys with a very high silicon content. A difficult high silicon content aluminum alloy is an alloy containing by weight 11.5 to 22.0 percent silicon, 0.4 to 0.9 percent magnesium, 1.5 to 2.0 percent copper, 0.4 to 0.9 percent maganese, a maximum of 0.7 percent iron, a maximum of 0.4 percent zinc, 0.3 to 1.0 percent nickel, and the remainder being aluminum.

Referring to FIGURE 3, a forged piston blank 17 is forged, from the preform 12, with a head end 18 containing the metal from the preform section 16. The forged piston blank 17 has the thick solid head portion 18, a relatively thin cylindrical skirt portion 19, and a pair of diametrically opposed thick wrist pin bosses 21 in the skirt depending from the head (only one wrist pin boss being illustrated). The skirt portion 19 of the forged piston blank is shown as continuous with the solid head portion. However, it is understood that the skirt may be flat sided at the pin bosses if desired.

The piston blank head 18 has a top end wall 22 and a bottom wall 23 with an annular ridge 24 extending axially upwardly from the top end wall 22 around the periphery thereof and having an outer diameter side wall 26 continuous with the outer diameter side wall 27 of the piston blank head 18. The ridge 24 has an inner wall 28 which converges to the top end wall 22 to form a pie-shape cavity.

Referring to FIGURE 4, there is illustrated a tubular form ring having a bottom end 33 and a top end 34. The form ring is either cast or machined from any of the typical zinc base casting alloys which have a melting temperature in the range of 700 to 900° F. A typical zinc alloy would include 4.1 percent aluminum, 2.7 percent copper, and 0.03 percent magnesium. The form ring has a mold wash layer 36 therearound which is coated on the ring by spraying, immersion and the like with a suspension of finely divided refractory materials such as silica, flour and water with sodium silicate as a binder.

Referring to FIGURES 5 and 6, there is illustrated the forged piston blank 17 which is formed by machining the forged piston blank illustrated in FIGURE 3, to form an annular groove 29 and to bevel the ridge outer wall 26 to follow the conveyance of the inner wall 28 and thereby form a frusto-conical annular ridge 24. The annular groove 29 is concentric with the annular ridge 24 and axially extends through the center thereof into the forged piston blank head for a predetermined distance to a closed end 31. The grooved forged piston blank is heated to forging temperatures of approximately 750 to 950° F. Then the tubular form ring 32 having a thickness substantially equal to the thickness of the annular groove 29 is inserted into the annular groove 29. The form ring end 33 is seated against the closed end 31 of the groove 29 and the form ring top end 34 is axially spaced a predetermined distance 36 inwardly from the piston head top wall 22. The space 36 has a volume substantially equal to the volume of the annular frusto-conical ridge 24.

The heated machined forged piston blank 17 having the form ring in the annular groove 29 therein is then subjected to an upsetting operation in suitable die means for closing the groove. The forged piston blank is restrained during the upsetting operation so that the diameter of the piston head 18 and piston skirt 19 are maintained constant and unchanged. Likewise, means are utilized to restrain the piston head top wall 22 and bottom wall 23 from expanding. Therefore, the upsetting operation only affects the frusto-conical ridge 24 which is approximately equal in volume to the volume of the space 36. The frusto-conical ridge is upset to close the groove 29 and substantially fill the space 36 and substantially flatten out the top end wall 22 to form an upset forged piston blank 37 having a piston head 18a with a flat top end wall 22a having a diameter equal to the diameter of the piston head 18a. When the space 32 is filled by the frusto-conical ridge 24 a circular juncture line 38 is formed thereby. It is preferred that the configuration of the oil gallery be such that a uniform heat path is provided each side of the juncture line 38 which is to be fused during a welding operation.

The insertion of the form ring 32 into the heated machined forged piston blank and the upset forging operation takes place in approximately two minutes. Since a very short time elapses after the form ring is placed in the groove until the upsetting operation is completed, insufficient heat transfer takes place to melt the form ring or reduce its physical properties significantly, even though forging upset temperatures may exceed the melting temperature of the material used to make the form ring.

Referring to FIGURE 7, there is illustrated the forged piston 42 having a closed annular oil gallery 43 with a flat piston head top end wall 22a which consists essentially of the piston and a weld bead 41 in a weld V-groove 39. The forged piston 42 is formed from the upset piston blank 37 by drilling two or more holes 44 through the piston head bottom wall 23 into the oil gallery 43. The form ring 32 can be melted and drained from the oil gallery anytime after the holes 44 are drilled. However, the form ring is preferably removed during the normal heat treating cycle of the forged piston blank which involves temperatures sufficient to melt the alloy materials normally used for the form ring. This heat treatment of the forged piston blank includes a solution treatment at 940 to 1,000° F., for two to four hours, followed by a water quench, followed by precipitation hardening at 300 to 450° F. for six to twenty hours. Any remnants of the form ring in the oil gallery 43 can be conveniently removed by flushing with a 50 percent solution of nitric acid at room temperature. The entire forged piston 42 can be immersed in the acid solution for one to two minutes without causing deleterious effects to the aluminum alloy. Then the weld V-groove is formed along the juncture line and the weld material is applied therein, to fuse close the oil gallery, in an inert atmosphere such as argon. The material utilized to form the weld bead 41 is a composition very similar to the material used to make the piston in order to avoid any difference in rate of thermoexpansion.

Referring to FIGURES 8 through 10 there is illustrated a second embodiment of the present invention illustrating another manner of manufacturing the forged piston 42 with oil gallery 43. This method of manufacturing the forged piston is preferably used with a relatively easy to forge aluminum alloy such as an alloy consisting essentially of by weight of 10.5 to 11.5 percent silicon, 0.5 to 0.9 percent magnesium, 1.5 to 2.0 percent copper, 0.4 to 0.9 percent manganese, and a maximum of 0.7 percent iron, and a maximum of 0.4 percent zinc, and the remainder being aluminum. This relatively easy to forge aluminum alloy is formed into a forged preform 46 having a die-cavity 47 on its top surface and a convex bottom wall 48. The forged preform 46 is forged into a piston blank 49 having a piston head 18 and a skirt 19. The forged piston blank is forged with a forging machine utilizing a suitable head plate having a suitable projections thereon to form the frusto-conical ridge 24 around the periphery of the piston head top wall 22 with an annular groove 29 extending therethrough into the piston head 18. The piston head has a bottom wall 23 and wrist pin bosses 21 also formed during forging operation. Therefore, this embodiment of the present invention eliminates the machining step utilized by the embodiment illustrated in FIGURES 1 through 6.

The forged piston blank 49 is heated to forging temperatures of approximately 750–950° F. Then the annular form ring 32 is placed in the annular groove 29 to have its bottom wall 33 seated on the closed end 31 of the groove 29. The top wall 34 of the form ring is axially spaced a predetermined distance inwardly from the piston head top wall 22. When the form ring is placed into the piston groove 29 the frusto-conical ridge 24 extending above the form ring is upset in a suitable piston restraining die that restrains the piston from expanding while closing the groove 29 with the frusto-conical ridge and thereby flatten the top end wall to form an upset forged piston 51 (FIGURE 10). The upset forged piston has a piston head 18a, and a skirt 19a equal in diameter to the piston head 18 and the skirt 19 of the forged piston blank 49. The piston head 18a has a substantially flat top end wall 22a with a circular weld V-groove 39 along a circular juncture line 38.

The upset forged piston 51 is then treated in a similar manner to the upset forged piston blank 37 to form the forged piston 42.

Referring to FIGURES 11–13 there is illustrated another embodiment of the present invention. The slug 11 (FIGURE 1) is forged into a solid preform 12 (FIGURE 2) and forged therefrom is a forged piston blank 61 having a head portion 62, a relatively thin cylindrical skirt portion 63 depending from the head, and a pair of diametrically opposed wrist pin bosses 64. The blank piston head 62 has a flat top end wall 65 with a cylindrical body portion 66, having a smaller diameter than the top end wall 65, integrally projecting concentrically outwardly therefrom for a predetermined distance. An annular groove 67 is formed in the head and having an inner diameter wall 67a thereof inwardly diverging from the side wall 68, of the cylindrical body 66, into the head 62. The annular groove 67 has an outer diameter wall 67b radially outwardly spaced from the side wall 68. The groove 67 has a triangular longitudinal cross-sectional configuration. The groove 67 is formed in the head 62 by being machined and/or being forged.

The grooved forged piston blank is heated to forging temperatures of approximately 700 to 950° F. Then a tubular form ring 69 having a cross-section substantially equal to the cross-section of the annular groove 67 is inserted into the annular grooves 67. The form ring 69 has a mold wash layer 71 therearound and is identical to the tubular inset ring 32 illustrated in FIGURE 4 except for its cross-sectional configuration.

The form ring 69 fills the groove cavity 67 and has its top surface substantially flush with the end wall 65.

After the form ring 69 is inserted into the heated grooved forged piston blank, the upset forging operation takes place. The forging is carried out with a plunger having an outer wall 72 with a diameter equal to the diameter of the piston head and having a dish-shaped cavity 73 formed concentrically in the face thereof. The dish-shaped cavity 73 has a mouth 74 having a larger diameter than the cylindrical body 66 and a volume substantially less than the volume of the cylindrical body 66. As the punch is moved toward the piston head, which is in a die cavity of a predetermined shape, the cylindrical body 66 is compressed such that its side wall 68 expands outwardly towards the outer diameter of the end wall 65. The forged piston blank 61 is restrained during the upsetting operation so that the diameter of the piston head 62 and the piston skirt 63 are maintained constant and unchanged. Likewise, means are utilized to restrain the blank piston head bottom wall 75 and wrist pin bosses 64 from expanding. Therefore, the upsetting operation affects only the cylindrical body 66. The cylindrical body 66 is compressed and radially expanded to be continuous with the outer diameter of the end wall 65 to form an upset forged piston blank 76 having a top circular end wall 77 having a diameter equal to the diameter of the piston head 62 and having an integral concentric dish-shaped projection 78 extending outwardly therefrom and forming a circular juncture line 79 around the side wall of the upset piston blank head 62a.

Referring to FIGURE 13 there is illustrated the forged piston 81 formed from the upset piston blank 76 by drilling two or more holes 82 through the piston head bottom wall 75 into a closed groove 67. An oil gallery 83 is formed by melting and draining the form ring 69 from the closed groove 67 any time after the holes 82 are drilled. A weld V-groove 84 is formed along the juncture line 79 and it will later be fused with a weld bead to form the completed piston 81. The projection 78 and a small portion of the end face 77 are machined off to provide a flat circular piston head end face 85.

The use of the above embodiment is preferred in that it provides a piston having an oil gallery and being fused with a weld bead along the side wall of the piston bead. A weld bead along side wall of the forged piston bead provides a piston which has a higher resistance to thermal stress because the weld bead is placed in an area where there is less thermal stress.

It is of course understood that although the coating on the form rings 32 and 69 acts as an effective heat barrier and aids in the removal of the form ring from the oil gallery, it is not necessary to have the coating on the form ring and said coating may be eliminated. Also, form rings of organic plastics could also be used provided they have sufficient compressive strength to maintain the desired shape of the oil gallerys during the upsetting operation and provided they could be decomposed or oxidized to the extent that they could be removed through the holes 44 and 82.

Likewise, it is of course understood that the forging techniques described above are not dependent on the use of a particular piston alloy nor a particular welding technique to close the oil gallery. For instance, it might be desirable to use an electron beam welding to close the oil gallery. Further, any combination of the two processes could be used. For instance, the piston of the present invention may be manufactured by machining the groove 29 and forge the weld V-groove 39.

The configuration of the ridges on the head of the forged blank adjacent to the groove could be modified. It is only necessary to provide the proper volume of material to fill the groove space above the form ring to form a flat piston head top wall. Also, it is desirable to locate this material so that a minimum amount of movement is required. The frusto-conical configuration illustrated in the drawings is preferred with normal piston alloys including both eutectic or hypereutectic alloys.

Therefore, our invention provides an effective method of manufacturing a forged piston with an oil gallery and an improved forged oil gallery piston.

Although various modifications might be suggested by those versed in the art, it should be understood that we wish to embody within the scope of the patent warranted hereon, all such embodiments as reasonably and properly become within the scope of our contribution to the art.

We claim as our invention:

1. A method of manufacturing an internal combustion engine piston comprising:

forming an aluminum alloy piston slug consisting of by weight 10.5–11.5 silicon, 0.5–0.9 percent magnesium, 1.5–2.0 percent copper, 0.4–0.9 percent manganese, no greater than 0.7 percent iron, no greater than 0.4 percent zinc, and the remainder being aluminum, forming a preform with said slug having a greater volume of stock near the outer diameter of the portion that forms a piston head, forging the preform and forming a forged piston blank having a piston head portion with a frusto-conical ridge axially outwardly extending from the top wall of said piston head around the periphery thereof and an annular axial blank groove concentric with and extending axially inwardly from the end of the ridge and a predetermined distance into the piston head and having a closed groove end, sizing said frusto-conical ridge to have a volume substantially equal to the volume necessary to close said annular groove and provide a substantially flat piston head top wall and an oil gallery cavity in the piston head, sizing a tubular form ring to have a volume equal to the volume of the oil gallery and a thickness equal to the thickness of the annular groove, said form ring being a zinc alloy having a melting temperature of 700–900° F. and having a refractory mold wash coating thereon comprising silica flour with a sodium silicate binder, heating said forged piston blank to temperatures of 750–950° F., in a maximum of two minutes inserting the tubular form ring in the annular groove, and upsetting the forged piston ridge to close the annular groove to provide a substantially flat piston head top wall with an annular weld V-groove therein concentric with the form ring and maintaining constant piston head and form ring volumes, drilling a plurality of circular holes through the bottom wall of the piston head to communicate with the form ring, solution treating the piston for two to four hours at temperatures of 940–1000° F., water quenching the solution treated piston, precipitation hardening the water quenched piston for six to twenty hours at temperatures of 300–450° F., immersing the entire hardened piston in a 50 percent solution of nitric acid for one to two minutes and thereby dissolve and drain the form ring from the piston head through the drilled holes to form the oil gallery in the piston head, and closing the piston head weld V-grooves with a weld bead alloy having the same rate of thermoexpansion as the piston head alloy and applying said weld bead alloy in an inert argon atmosphere.

2. A method of manufacturing a piston comprising:

forming a forged aluminum alloy piston blank consisting of by weight 10.5–11.5 percent silicon, 0.5–0.9 percent magnesium, 1.5–2.0 percent copper, 0.4–0.9 percent manganese, no greater than 0.7 percent iron, no greater than 0.4 percent zinc, and the remainder being aluminum and having a piston portion with a frusto-conical ridge axially outwardly extending from the top wall of said piston head around the periphery thereof and an annular axial blank groove concentric with an extending axially inwardly from the end of the ridge a predetermined distance into the piston head and having a closed groove end, sizing said frusto-conical ridge to have a volume substantially equal to the volume necessary to close said annular groove and provide a substantially flat piston head top wall and an oil gallery cavity in the piston head, sizing a tubular form ring to have a volume equal to the volume of the oil gallery and a thickness equal to the thickness of the annular groove, said form ring being a zinc alloy having a melting temperature of 700–900° F. and having a refractory mold wash coating thereon comprising silica flour with a sodium silicate binder, heating said forged piston blank to forging temperatures of 750–950° F., in a maximum of two minutes inserting the tubular form ring in the annular groove, and upsetting the forged piston ridge to close the annular groove to provide a substantially flat piston head top wall with an annular weld V-groove therein concentric with the form ring and maintaining constant piston head and form ring volumes, drilling a plurality of circular holes through the bottom wall of the piston head to communicate with the form ring, solution treating the piston for two to four hours at temperatures of 940–1000° F., water quenching the solution treated piston, precipitation hardening the water quenched piston for six to twenty hours at temperatures of 300–450° F., immersing the entire hardened piston in a solution of nitric acid for up to two minutes and thereby dissolve and drain the form ring from the piston head through the drilled holes to form the oil gallery in the piston head, and closing the piston head weld V-grooves with a weld bead alloy having the same rate of thermoexpansion as the piston head alloy and applying said weld bead alloy in an inert argon atmosphere.

3. A method of manufacturing an internal combustion engine piston comprising:

forming a forged aluminum alloy piston blank consisting of by weight 10.5–11.5 percent silicon, 0.5–0.9 percent magnesium, 1.5–2.0 percent copper, 0.4–0.9 percent manganese, no greater than 0.7 percent iron, no greater than 0.4 percent zinc, and the remainder being aluminum, and having a piston head with a frusto-conical ridge axially outwardly extending from the top wall of said piston head around the periphery thereof and an annular axial blank groove concentric with an extending axially inwardly from the end of the ridge a predetermined distance into the piston head and having a closed groove end, sizing said frusto-conical ridge to have a volume substantially equal to the volume necessary to close said annular groove and provide a substantially flat piston head top wall and an oil gallery cavity in the piston head, sizing a tubular form ring to have a volume equal to the volume of the oil gallery and a thickness equal to the thickness of the annular groove, said form ring being a metal selected from the group consisting of zinc and zinc alloy having a melting temperature of 700–900° F., heating said forged piston blank to forging temperatures in a maximum of two minutes inserting the tubular form ring in the annular groove, upsetting the forged piston ridge to close the annular groove to provide a substantially flat piston head top wall with a circular juncture line and an annular weld V-groove therein concentric with the form ring, and maintaining constant piston head and form ring volumes during said upsetting, drilling a plurality of circular holes through the bottom wall of the piston head to communicate with the form ring, heat treating the forged piston at temperatures to melt the form ring and drain the form ring from the piston head through the drilled holes to form the oil gallery in the piston head, and closing the piston head weld V-grooves with a weld bead alloy having the same rate of thermoexpansion as the piston head.

4. A method of manufacturing an internal combustion engine piston comprising:

forming a forged aluminum alloy piston blank comprising 10.5–11.5 percent by weight silicon, and having a piston head with a frusto-conical ridge axially outwardly extending from the top wall of said piston head around the periphery thereof and an annular axial groove concentric with and extending axially inwardly through the ridge a predetermined distance into the piston head and having a closed end, sizing said frusto-conical ridge to have a volume substantially equal to the volume necessary to close said annular groove and provide a substantially flat piston head top wall and an oil gallery cavity in the piston head, sizing a tubular form ring to have a volume equal to the volume of the oil gallery and a thickness equal to the thickness of the annular groove, said form ring being selected from the group consisting of zinc and zinc alloy having a melting temperature of 700–900° F. and having a refractory mold wash coating thereon comprising silica flour with a sodium silicate binder, heating said forged piston blank to forging temperature of 750–950° F., in a maximum of two minutes inserting the tubular form ring in the annular groove, upsetting the forged piston ridge to close the annular groove to provide a substantially flat piston head top wall with a circular juncture line and an annular weld V-groove therein concentric with the form ring, and maintaining constant piston head and form ring volumes during said upsetting, and said oil gallery and ridge being shaped to provide a uniform heat path on each side of the juncture line, drilling a plurality of holes through the bottom wall of the piston head to communicate with the form ring, solution treating the piston for two to four hours at temperatures sufficient to melt the form ring and drain the form ring from the oil gallery, water quenching the solution treated piston, precipitation hardening the water quenched piston for six to twenty hours at temperatures of 300–450° F., immersing the entire hardened piston in a solution of nitric acid, and closing the piston head weld V-grooves with a weld head alloy having the same rate of thermoexpansion as the piston head.

5. A method of manufacturing a forged piston with an oil gallery comprising:

forming a forged aluminum alloy piston blank having a piston head with a frusto-conical ridge axially extending outwardly from the top wall of said piston head around the periphery thereof and an annular axial groove extending axially inwardly through the ridge a predetermined distance into the piston blank head portion, sizing said frusto-conical ridge to have a volume substantially equal to the volume necessary to close said annular groove and provide a substantially flat piston head top wall and an oil gallery cavity in the piston head, sizing a form ring to have a volume equal to the volume of the oil gallery and a thickness equal to the thickness of the annular groove, said form ring having a melting temperature of 700–900° F. and having a compressive strength sufficient to maintain its shape during an upsetting operation, heating said forged piston blank to temperatures of 750–950° F., in a maximum of two minutes inserting the tubular form ring in the annular groove, and upsetting the forged piston ridge to close the annular groove to provide a substantially flat piston head top wall with a circular juncture line, an annular weld V-groove therein concentric with the form ring, and maintaining constant piston head and form ring volumes, drilling a plurality of holes through the bottom wall of the piston head to communicate with the form ring, heat treating the forged piston and melting and draining the form ring from the piston head through the drilled holes to form the oil gallery in the piston head, and closing the piston head weld V-grooves with a weld head.

6. A method of manufacturing a forged piston comprising:

forming a forged aluminum alloy piston blank having a piston head portion with a frusto-conical ridge extending axially outwardly from the top wall of said piston head around the periphery thereof and an annular axial groove extending axially inwardly through the ridge a predetermined distance into the piston head, sizing said frusto-conical ridge to have a volume substantially equal to the volume necessary to close said annular groove and provide a substantially flat piston head top wall and an oil gallery cavity in the piston head, sizing a form ring to have a volume equal to the volume of the oil gallery, said form ring having a melting temperature of 700–900° F. and a compressive strength sufficient to maintain its shape during an upsetting operation, heating said forged piston blank to forging temperatures of 750–950° F., in a maximum of two minutes inserting the tubular form ring in the annular groove, and upsetting the forged piston ridge to close the annular groove to provide a substantially flat piston head top wall with a circular juncture line an annular weld V-groove therein concentric with the form ring and maintaining constant piston head and form ring volumes, drilling a plurality of holes through the piston head to communicate with the form ring, heat treating the forged piston and removing the form ring from the piston head to form the oil gallery in the piston head, and fusing the piston head juncture line.

7. The method of manufacturing a forged piston comprising:

forming a forged piston blank having a piston head portion with a ridge extending axially outwardly from the top wall of said piston head and an annular axial groove extending through the ridge a predetermined distance into the piston head, inserting a form ring having a predetermined lesser volume than the volume of the groove into said groove, upsetting said piston head ridge to fill the piston head space therewith while maintaining constant piston head and form ring volumes to form a flat piston head to top wall with a juncture line, drilling a plurality of holes through the bottom of the piston head to communicate with the form ring, removing the ring from the piston head through the drilled holes to form the desired oil gallery in the piston head, and fusing the juncture line.

8. A method of manufacturing a forged piston comprising:

forming a forged piston blank having a piston head with a ridge extending axially outwardly from the top end wall of said piston head and an axial groove concentric with and extending axially inwardly through the ridge a predetermined distance into the piston head, sizing said ridge to have a volume substantially equal to the volume necessary to close said groove and provide a substantially flat piston top end wall and an oil gallery cavity in the piston head, sizing a form means to have a volume equal to the volume of the oil gallery and a thickness equal to the thickness of the groove, heating said forged piston blank to forging temperatures, in a maximum of two minutes inserting the form means in the annular groove, and upsetting the forged piston ridge to close the groove to provide a substantially flat piston head top end wall with a juncture line, and maintaining constant piston head and form ring volumes during said upsetting operation, drilling a plurality of holes through the piston head to communicate with the form ring, removing the form ring from the piston head to form the oil gallery in the piston head, and fusing the piston head juncture line to provide the forged piston with the oil gallery therein.

9. In a method of manufacturing a piston having a piston head the steps comprising:

forming a ridge on the piston head face, forming a groove in said piston head face adjacent said ridge, placing form means sized to an oil gallery in said groove, upsetting said piston head to close said groove with said ridge, removing said form means from said piston head to form the oil gallery therein.

10. In a method of manufacturing a piston having a piston head with an oil gallery the steps comprising:

forming a ridge on the piston head face, forming a groove in said piston head face adjacent said ridge having a volume larger than the volume of the oil gallery, placing form means equal in size to the oil gallery in said groove, upsetting said piston head to close said groove with said ridge, maintaining the size of said form ring during said upsetting operation removing said form means from said piston head to form the oil gallery therein.

11. In a method of manufacturing a forged piston having a piston head with an oil gallery the steps comprising:

forming a groove in said piston head face having a volume larger than the volume of the oil gallery and a ridge adjacent said groove, placing form means in said groove equal in size to the size of the oil gallery, upsetting said piston head to close said groove with said ridge and form a substantially flat piston head face, removing said form means from said piston head to form the oil gallery therein.

12. The method of manufacturing an internal combustion engine piston comprising:

forming an aluminum alloy piston slug consisting of by weight 19.0–22.0 percent silicon, 0.4–0.9 percent magnesium, 1.5–2.0 percent copper, 0.4–0.9 percent manganese, no greater than 0.7 percent iron, no greater than 0.4 percent zinc, 0.3–1.0 percent nickel, and the remainder being aluminum, forming a preform with said slug, forging the preform and forming a forged piston blank having a piston head portion with a ridge extending axially outwardly from the top wall of said piston head around the periphery thereof, shaping the ridge to a frusto-conical shape, forming an annular axial blank groove concentric with and extending axially inwardly from the end of the ridge a predetermined distance into the piston head portion and having a closed groove end, sizing said frusto-conical ridge to have a volume substantially equal to the volume necessary to close said annular groove and provide a substantially flat piston head top wall and an oil gallery cavity in the piston head, sizing a tubular form ring to have a volume equal to the volume of the oil gallery and a thickness equal to the thickness of the annular groove, said form ring being a zinc alloy having a melting temperature of 700–900° F. and having a refractory mold wash coating thereon comprising silica flour with a sodium silicate binder, heating said forged piston blank to temperatures of 750–950° F., in a maximum of two minutes inserting the tubular form ring in the annular groove, and upsetting the forged piston ridge to close the annular groove to provide a substantially flat piston head top wall with a circular juncture line concentric with the form ring and maintaining constant piston head and form ring volumes, drilling a plurality of circular holes through the bottom wall of the piston head to communicate with the form ring, solution treating the piston for two to four hours at temperatures of 940–1000° F., water quenching the solution treated piston, precipitation hardening the water quenched piston for six to twenty hours at temperatures of 300–450° F., immersing the entire hardened piston in a 50 percent solution of nitric acid for one to two minutes and thereby dissolve and drain the form ring from the piston head through the drilled holes to form the oil gallery in the piston head, forming an annular weld V-groove along said juncture line, and closing the piston head weld V-groove with a weld bead alloy having the same rate of thermoexpansion as the piston head alloy and applying said weld bead alloy in an inert argon atmosphere.

13. A method of manufacturing a forged internal combustion engine piston having a piston head with an oil gallery comprising:

forming an aluminum alloy piston blank consisting of by weight 19.0 percent magnesium, 1.5–2.0 percent copper, 0.4–0.9 percent manganese, no greater than 0.7 percent iron, no greater than 0.4 percent zinc, 0.3–1.0 percent nickel, and the remainder being aluminum, and having the piston head with a frusto-conical ridge extending axially outwardly from the top end wall of said piston head around the periphery thereof and an annular axial groove concentric with and extending axially inwardly through the ridge a predetermined distance into the piston head and having a closed end, sizing said frusto-conical ridge to have a volume substantially equal to the volume necessary to close said annular groove and provide a substantially flat piston head top end wall and the oil gallery in the piston head, sizing a tubular form ring to have a volume equal to the volume of the oil gallery and a thickness equal to the thickness of the annular groove, said form ring being selected from the group consisting of zinc and zinc alloy having a melting temperature of 700–900° F. and having a refractory mold wash coating thereon comprising silica flour with a sodium silicate binder, heating said forged piston blank to forging temperatures of 750–950° F., in a maximum of two minutes inserting the tubular form ring in the annular groove, upsetting the forged piston ridge to close the annular groove to provide a substantially flat piston head top wall with a circular juncture line and an annular weld V-groove therein concentric with the form ring, and maintaining constant piston head and form ring volumes during said upsetting, and said oil gallery and ridge being shaped to provide a uniform heat path on each side of the juncture line, drilling a plurality of holes through the bottom wall of the piston head to communicate with the form ring, solution treating the piston for two to four hours at temperatures of 940–1000° F., water quenching the solution treated piston, precipitation hardening the water quenched piston for six to twenty hours at temperatures of 300–450° F., immersing the entire hardened piston in a 50 percent solution of nitric acid for one to two minutes and thereby dissolve and drain the form ring from the piston head through the drilled holes to form the oil gallery in the piston head, and fusing the piston head weld V-grooves with a weld bead alloy having the same rate of thermoexpansion as the piston head.

14. A method of manufacturing a forged piston having a piston head with an oil gallery comprising:

forming an aluminum alloy piston blank consisting of by weight 19.0–22.0 percent silicon and having the piston head portion with a ridge extending axially from the top end wall of said piston head around the periphery thereof and an annular axial blank groove concentric with and extending axially inwardly through the end of the ridge a predetermined distance into the piston head, sizing said ridge to have a volume substantially equal to the volume necessary to close said annular groove and provide a substantially flat piston head top end wall and the oil gallery in the piston head, sizing a form ring to have a volume equal to the volume of the oil gallery, said form ring having a melting temperature of 700–900° F. and having a compressive strength sufficient to maintain its shape during an upsetting operation, a refractory mold wash coating thereon comprising silica flour with a sodium silicate binder, heating said forged piston blank to temperatures of 750–950° F., in a maximum of two minutes inserting the tubular form ring in the annular groove and upsetting the forged piston ridge to close the annular groove to provide a substantially flat piston head top end will with a junction line thereon concentric with the form ring and maintaining constant piston head and form ring volumes, drilling a plurality of holes through the bottom wall of the piston head to communicate with the form ring, heat treating the forged piston and removing the form ring from the piston head through the drilled holes to form the oil gallery in the piston head, and fusing the piston head juncture line.

15. A method of manufacturing a forged piston comprising:

forming a forged aluminum alloy piston blank having a blank piston head portion with a cylindrical extension extending axially outwardly and concentrically from the top wall of said blank piston head, an annular oil gallery groove extending axially inwardly a predetermined distance into the blank piston head, sizing a form ring to have a volume equal to the volume of the oil gallery groove, said form ring having a melting temperature of 700–900° F. and a compressive strength sufficient to maintain its shape during an upsetting operation, heating said forged piston blank to forging temperatures of 750–950° F., in a maximum of two minutes inserting the tubular form ring in the annular groove, and upsetting the forged piston cylindrical extension to close the annular groove to provide a substantially flat annular upset piston head top wall and a circular juncture line with an annular weld V-groove around the side of the upset piston head and maintaining constant blank piston head and form ring volumes, drilling a plurality of holes through the piston head to communicate with the form ring, heat treating the forged piston and removing the form ring from the piston head to form an oil gallery in the piston head, and fusing the piston head juncture line.

16. The method of manufacturing a forged piston comprising:

forming a forged piston blank having a blank piston head portion with a cylindrical extension extending axially outwardly from and concentrically with the top wall of said piston head and an annular axial groove extending a predetermined distance into the piston head, inserting a form ring having a volume substantially equal to the volume of the groove into said groove, upsetting said blank piston head extension while maintaining constant blank piston head and form ring volumes to form an upset piston head with a juncture line around the side thereof, drilling a plurality of holes through the bottom of the piston head to communicate with the form ring, removing the ring from the piston head through the drilled holes to form the desired oil gallery in the piston head, and fusing the juncture line.

17. In a method of manufacturing a piston having a piston head the steps comprising:

forming a cylindrical extension on the piston head face, forming a groove in said piston head face adjacent said extension, placing form means sized to an oil gallery in said groove, upsetting said piston head to close said groove with said extension, removing said form means from said piston head to form the oil gallery therein.

18. In a method of manufacturing a piston having a piston head with an oil gallery the steps comprising:

forming an extension on the piston head face, forming a groove in said piston head face adjacent said extension having a volume equal to the volume of the oil gallery, placing form means equal in size to the oil gallery in said groove, upsetting said piston head to close said groove with said extension, maintaining the size of said form ring during said upsetting operation, removing said form means from said piston head to form the oil gallery therein.

References Cited
UNITED STATES PATENTS

| | | | |
|---|---|---|---|
| 2,047,555 | 7/1936 | Gardner | 29—423 X |
| 2,093,775 | 9/1937 | Colwell | 29—156.7 X |
| 2,159,989 | 5/1939 | Hazen | 92—186 |
| 2,772,933 | 12/1956 | Nichols | 92—186 |
| 2,836,884 | 6/1958 | Graham | 29—423 |
| 2,882,106 | 4/1959 | Meurer | 92—186 X |
| 3,010,186 | 11/1961 | Townhill | 29—156.5 |
| 3,123,899 | 3/1964 | Townhill | 29—156.5 |
| 3,189,010 | 6/1965 | Isley | 92—186 X |
| 3,204,617 | 7/1965 | Hulbert | 92—186 X |
| 3,258,816 | 7/1966 | Rearwin | 22—168 |

FOREIGN PATENTS

| | | |
|---|---|---|
| 231,248 | 5/1963 | Austria. |
| 1,162,420 | 9/1958 | France. |

JOHN F. CAMPBELL, *Primary Examiner.*

K. J. ALBRECHT, *Examiner.*

J. L. CLINE, *Assistant Examiner.*